US006954210B2

(12) United States Patent
Nishi

(10) Patent No.: US 6,954,210 B2
(45) Date of Patent: Oct. 11, 2005

(54) DISPLAY DATA GENERATING DEVICE

(75) Inventor: Hidefumi Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/886,670

(22) Filed: Jul. 9, 2004

(65) Prior Publication Data

US 2005/0184996 A1 Aug. 25, 2005

(30) Foreign Application Priority Data

Feb. 24, 2004 (JP) .............................. 2004-048062

(51) Int. Cl.[7] ............................................... G06F 12/02

(52) U.S. Cl. ...................... 345/565; 345/530; 345/543; 345/544; 711/1; 711/147; 711/173

(58) Field of Search ................................ 345/565, 530, 345/543–544; 711/1, 147, 153, 170, 173

(56) References Cited

U.S. PATENT DOCUMENTS 6,202,180 B1 * 3/2001 Nose .......................... 714/718
6,282,141 B1 * 8/2001 Muranaka et al. ..... 365/230.03
6,570,687 B2 * 5/2003 Araki et al. ................ 398/101

FOREIGN PATENT DOCUMENTS

JP 06-119437 4/1994

* cited by examiner

*Primary Examiner*—Matthew C. Bella
*Assistant Examiner*—Mackly Monestime
(74) *Attorney, Agent, or Firm*—Arent Fox, PLLC.

(57) ABSTRACT

An address converting unit receives pixel coordinates of a display screen in sequence and converts the received pixel coordinates to addresses and offsets. The addresses and offsets obtained from the conversions are stored in buffers in sequence respectively. A buffer controlling unit detects that one of the buffers is full. In response to the detection by the buffer controlling unit, a pixel processing unit modifies pixel data corresponding to the plural addresses read from the memory device according to pixel information. The pixel data stored in the memory device are rewritten according to the pieces of pixel information inputted in correspondence with the pixel coordinates. Therefore, the pieces of pixel data corresponding to the plural addresses are rewritten at a time.

23 Claims, 15 Drawing Sheets

DISPLAY DATA GENERATING DEVICE

CROSS REFERENCE TO RELATED APPLICATION

This application is based upon and claims the benefit of priority from Japanese Patent Application No. 2004-048062, filed on Feb. 24, 2004, the entire contents of which are incorporated herein by reference.

BACKGROUND OF THE INVENTION

1. Field of the Invention

The present invention relates to a display data generating device that generates data for displaying an image on a display device or the like.

2. Description of the Related Art

A car navigation system, a game machine, a cellular phone, and so on internally have a display data generating device for generating display data to be displayed on a screen.

This display data generating device has a memory device to which memory areas corresponding to pixel areas of a display screen are allotted. An SDRAM (Synchronous Dynamic Random Access Memory) that operates in synchronization with a clock, or the like is used for the memory device. The display data generating device receives pixel coordinates and pixel information outputted from a controller, converts the pixel coordinates to an address in the memory device, and according to the pixel information, modifies pixel data stored in a memory area designated by the address obtained by the conversion.

Generally, in a display data generating device, a plurality of memory devices are connected in parallel and the bus width (one word) of a data signal of each memory device is constituted of 64 bits or 128 bits. Pixel information necessary to constitute one pixel is normally 16 bits or 32 bits. For example, when information of one pixel is constituted of 16 bits and the bus width of a memory device is constituted of 64 bits, one access to the memory device enables pixel data read or write for 4 pixels. Reading or writing pixel data for one word at a time from/to the memory device improves access efficiency of the memory device (disclosed in, for example, Japanese Unexamined Patent Application Publication No. Hei 6-119437).

The conventional display data generating device executes read and write operations to the memory device for every one word, however, there has been a demand for further improvement in access efficiency in order to increase image display speed. Further, the display data generating device modifies the pixel data for every one word as described above. This makes it necessary to control circuit blocks in the display data generating device every time an access for one word occurs, which requires constant supply of clocks to each of the circuit blocks. As a result, it has been difficult to reduce its power consumption.

SUMMARY OF THE INVENTION

It is an object of the present invention to further improve access efficiency of a display data generating device to a memory device, thereby increasing image display speed.

It is another object of the present invention to reduce the power consumption of a display data generating device.

According to a first aspect of the present invention, an address converting unit receives pixel coordinates of a display screen in sequence to convert each of the received pixel coordinates to an address and an offset. Here, the address designates a position of one of the memory areas in a memory device, and the offset represents a position at which pixel data are stored in the memory area which is selected according to the address. The memory device has memory areas allotted thereto, each of which stores, for each pixel, pixel data to be displayed on pixels in a display screen, and the pixel data corresponding to a predetermined number of successive pixels are accessible at once.

The addresses and offsets that are obtained from the conversions are stored in an address buffer and an offset buffer, respectively. An address comparing unit compares two addresses obtained from the conversions in sequence, and inhibits the addresses from being redundantly stored in the address buffer when the addresses match with each other. A buffer controlling unit detects that one of the address buffer and the offset buffer is full.

In response to the detection by the buffer controlling unit, a pixel processing unit modifies pieces of pixel data corresponding to plural addresses read from the memory device, according to pixel information. Then, the pixel data stored in the memory device are rewritten according to pieces of pixel information inputted in correspondence with the pixel coordinates. The pieces of pixel data corresponding to the plural addresses are rewritten at once, so that access frequency to the memory device is lowered, resulting in improved access efficiency. As a result, it is able to shorten the time required to display the pixel data on the display screen. Therefore, it is able to increase the display speed of the pixel data on the display screen.

According to a second aspect of the present invention, a display data generating device includes the aforesaid memory device, address converting unit, address buffer, offset buffer, address comparing unit, and pixel processing unit. The display data generating device also includes a buffer controlling unit that detects that the addresses stored in the address buffer are discontinuous. The pixel processing unit starts modifying the pixel data when the addresses stored in the address buffer become discontinuous. This enables efficient access to areas with successive addresses in the memory device. As a result, the access efficiency can be improved, so that the display speed of the pixel data on the display screen can be increased.

According to a third aspect of the present invention, a display data generating device includes: a plurality of display data processing units each including the aforesaid address converting unit, address buffer, offset buffer, address comparing unit, buffer controlling unit, and pixel processing unit; the aforesaid memory device; and a main controlling unit to control operations of the display data processing units. The display data processing units process pieces of pixel information corresponding to one pixel, respectively. In response to the detection by the buffer controlling unit of one of the display data processing units, the main controlling unit controls a corresponding pixel processing unit of one of the display data processing units to execute the modification processing on the pixel and rewrite the pixel data stored in the memory device. Therefore, the display data generating device that processes each of the pieces of pixel information corresponding to one pixel can have improved access efficiency to the memory device and can display the pixel data on the display screen with a higher speed.

According to the first to third aspects of the present invention, it is preferable that in response to the detection by the buffer controlling unit, a memory controlling unit successively reads from the memory device the pixel data corresponding to the plural addresses and successively writes the pixel data modified by the pixel processing unit to the memory device. Successively executing both the read operation and the write operation can further improve the access efficiency to the memory device, resulting in further increase in the display speed of the pixel data on the display screen.

According to a fourth aspect of the present invention, a display data generating device includes a plurality of pixel processing blocks each having a display data processing unit. Each display data processing unit includes the aforesaid address converting unit, address buffer, offset buffer, address comparing unit, buffer controlling unit, and pixel processing unit. The display data generating device also includes: a plurality of pixel processing blocks which process pixel information associated with different pixels from each other, respectively; the aforesaid memory device; and a main controlling unit which controls operations of the pixel processing blocks. In response to the detection by the buffer controlling unit of the display data processing unit, the main controlling unit controls, for each of the pixel processing blocks, a corresponding one of the pixel processing units to execute the modification processing and rewrite the pixel data stored in the memory device. Therefore, in the display data generating device that independently processes pixel information corresponding to different pixels, it is possible to improve access efficiency to the memory device and improve the display speed of the pixel data on the display screen.

According to the fourth aspect of the present invention, it is preferable that each of the pixel processing blocks includes a plurality of display data processing units. In response to the detection by the buffer controlling unit of one of the display data processing units in each of the pixel processing blocks, the main controlling unit controls a corresponding pixel processing unit of one of the display data processing units to execute the modification processing on the pixel data in order to rewrite the pixel data stored in the memory device. Therefore, in a display data generating device that independently processes pieces of pixel information corresponding to different pixels from each other, it is possible to improve access efficiency to the memory device, and increase the display speed of the pixel data on the display screen.

According to the fourth aspect of the present invention, it is preferable that in response to the detection by the buffer controlling unit in each of the pixel processing blocks, the memory controlling unit successively reads from the memory device the pixel data corresponding to plural addresses and successively writes the pixel data modified by the pixel processing unit to the memory device. Successively executing the read and write operations for each of the pixel processing blocks makes it possible to further improve the access efficiency to the memory device, resulting in further increase in the display speed of the pixel data on the display screen.

According to the third and fourth aspects of the present invention, it is preferable that a clock generating unit generates clocks to be supplied to the display data processing units, respectively. A clock controlling unit stops supplying corresponding clock(s) to the display data processing unit(s) in nonoperation. This can reduce power consumption of the display data generating device.

According to the first to fourth aspects of the present invention, it is preferable that the clock generating unit generates clocks to be supplied to a plurality of circuit blocks in the display data generating device, respectively. The clock controlling unit stops supplying corresponding clock(s) to the circuit block(s) in nonoperation. This can reduce power consumption of the display data generating device.

According to the first to fourth aspects of the present invention, it is preferable that the memory device has a burst access function to be successively readable or writable of data corresponding to successive addresses upon receiving of a first address and without receiving second and subsequent addresses. Accessing the memory device by use of the burst access function makes it possible to further improve the access efficiency, and increase the display speed of the pixel data on the display screen.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
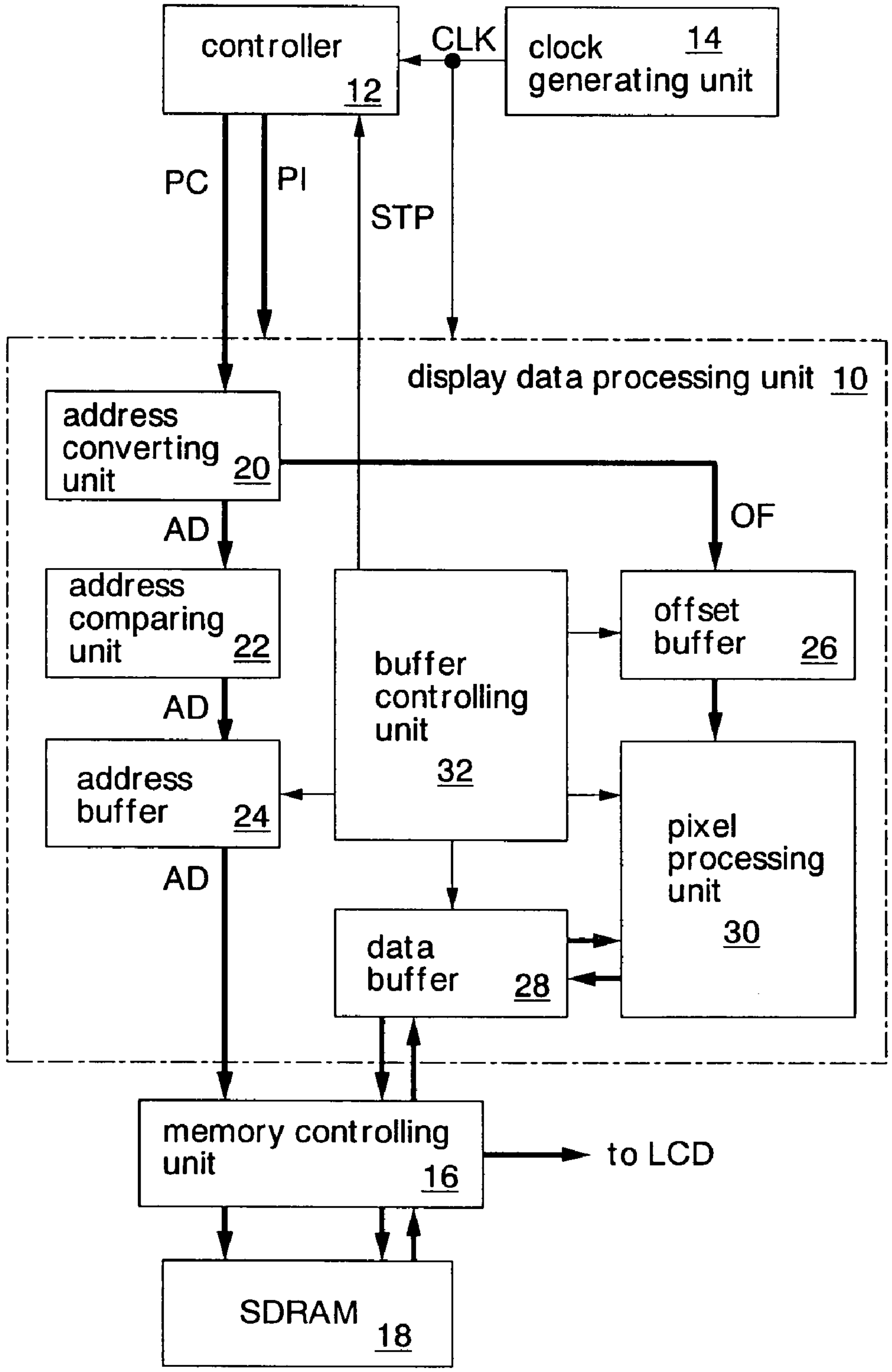
FIG. 1 is a block diagram showing a first embodiment of the display data generating device of the present invention.

Hereinafter, embodiments of the present invention will be described using the drawings. In the drawings, each signal line shown by the heavy line is constituted of a plurality of bits. Further, part of blocks to which the heavy lines are connected is constituted of a plurality of circuits.

FIG. 1 shows a first embodiment of the display data generating device of the present invention. This display data generating device is mounted in, for example, a car navigation system. The display data generating device has a display data processing unit 10, a controller 12, a clock generating unit 14, a memory controlling unit 16, and an SDRAM 18. The display data processing unit 10 has an address converting unit 20, an address comparing unit 22, an address buffer 24, an offset buffer 26, a data buffer 28, a pixel processing unit 30, and a buffer controlling unit 32.

The controller 12 operates in synchronization with a clock CLK to control the entire operation of the car navigation system and it also outputs to the display data processing unit 10 pixel coordinates PC and pixel information PI corresponding to the pixel coordinates PC. The pixel coordinates PC, an abscissa X (for example, 0 to 639) and an ordinate Y (for example, 0 to 479), represent the position of each of pixels constituting a screen of a liquid crystal display device LCD of the car navigation system. The pixel information PI is information for modifying pixel data to be displayed on each pixel. The controller 12 stops outputting the pixel coordinates PC while receiving a stop signal STP from the display data processing unit 10.

The clock generating unit 14 has a not-shown oscillator and generates the clock CLK to be supplied to the controller 12 and the display data processing unit 10. For use of the clock CLK is used in the entire car navigation system, the clock generating unit 14 may be formed outside the display data generating device.

The SDRAM 18 is configured such that a plurality of SDRAM chips are connected in parallel, and the number of data terminals thereof is 64 bits which is the same as the data bus width of the controller 12. The SDRAM 18 is allotted a frame buffer area storing display data to be displayed on the screen (for example, 640×480 pixels) of the liquid crystal display device LCD. The frame buffer area has a capacity to store pixel data for 8 frames, for example. In this embodiment, pixel data for displaying one pixel is constituted of 16 bits. Therefore, four pieces of pixel data are stored in a one-word memory area allotted to one address. The frame buffer area will be explained in detail in FIG. 2 to be described later. Further, the SDRAM 18 has a burst access function of allowing successive data read operations or data write operations corresponding to successive addresses in response to the receipt of the first address without receiving the second and subsequent addresses.

The memory controlling unit 16 receives an instruction from the display data processing unit 10 to control accesses to the SDRAM 18 and it also transfers the display data stored in the SDRAM 18 to the liquid crystal display device LCD. When access addresses to the SDRAM 18 are successive, the memory controlling unit 16 uses the burst access function to execute the read operations or the write operations to the SDRAM 18.

The address converting unit 20 converts the pixel coordinates PC sequentially received from the controller 12 to addresses AD representing the positions of the memory areas in the SDRAM 18 corresponding to the received pixel coordinates PC, and to offsets OF representing the storage positions of the pixel data in one word (64 bits) selected based on the addresses AD. The operation of the address converting unit 20 will be explained in later-described FIG. 3.

The address comparing unit 22 compares two addresses successively received from the address converting unit 20. When the address AD currently received matches with the preceding address AD, the address comparing unit 22 does not store the currently received address AD in the address buffer 24, and when the currently received address AD does not match with the preceding address AD, it stores the currently received address AD in the address buffer 24. In most cases, the pixel coordinates PC successively supplied to the display data processing unit 10 have the same address AD and they are different only in the offset OF. The address comparing unit 22 can prevent the same addresses AD from being redundantly stored in the address buffer 24, resulting in improved usability of the address buffer 24.

The address buffer 24 has an area for storing 8 addresses AD corresponding to 32 pieces of pixel data at the maximum. The address buffer 24 outputs the stored address AD to the memory controlling unit 16 in response to an instruction from the buffer controlling unit 32. The offset buffer 26 has an area for storing 32 offsets OF. The offset buffer 26 outputs the stored offset OF to the pixel processing unit 30 in response to an instruction from the buffer controlling unit 32.

The data buffer 28 has an area for storing pixel data for 8 words (=32 pixels) that are read from/written to the SDRAM 18 via the memory controlling unit 16. Further, the pixel data stored in the data buffer 28 are readable/writable by the pixel processing unit 30. The pixel processing unit 30 holds the pixel information PI supplied from the controller 12 together with the pixel coordinates PC in such a manner that the pixel information PI is associated with the address AD and the offset OF. In response to an instruction from the buffer controlling unit 30, the pixel processing unit 30 modifies, according to the pixel information held therein, the pixel data read from the SDRAM 16 to the data buffer 28.

The buffer controlling unit 32 controls the entire operation of the display data processing unit 10. The buffer controlling unit 32 constantly monitors the number of the addresses AD stored in the address buffer 24 and the number of the offsets OF stored in the offset buffer 26. When detecting that one of the address buffer 24 and the offset buffer 26 is full, the buffer controlling unit 32 outputs the stop signal STP to the controller 12 so that the controller 12 stops supplying the pixel coordinates PC and the pixel information PI. The buffer controlling unit 32 further executes modification processing on the pixel data written to the SDRAM 18, according to the received pixel coordinates PC and pixel information PI.

Figure 2:
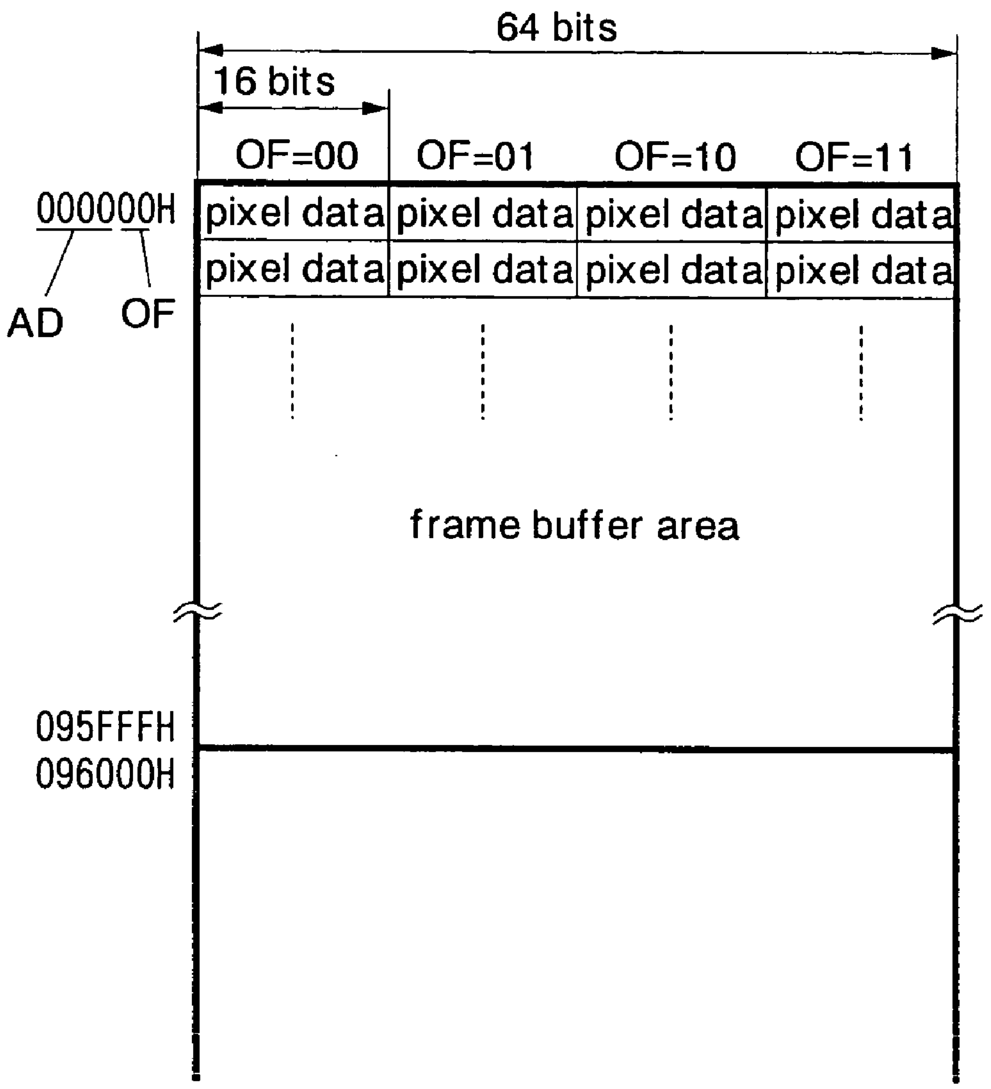
FIG. 2 is an explanatory view showing a memory space of an SDRAM shown in FIG. 1.

FIG. 2 shows a memory space of the SDRAM 18 shown in FIG. 1. The final "H" of each address represents a hexadecimal number. In the memory space of the SDRAM 18, the addresses 000000H to 095FFFH (39.3 Mbits=614.4 kwords) are allotted to the frame buffer area holding the display data for 8 frames of the liquid crystal display device LCD (640×480×16 bits×8 frames). A data area of one word (64 bits) inputted/outputted by one access to the SDRAM 18 stores pixel data for four pixels that are continuous on the screen of the liquid crystal display device LCD. The offset OF corresponds to lower 2 bits of the address and represents the position of the pixel data in one word as described above.

Figure 3:
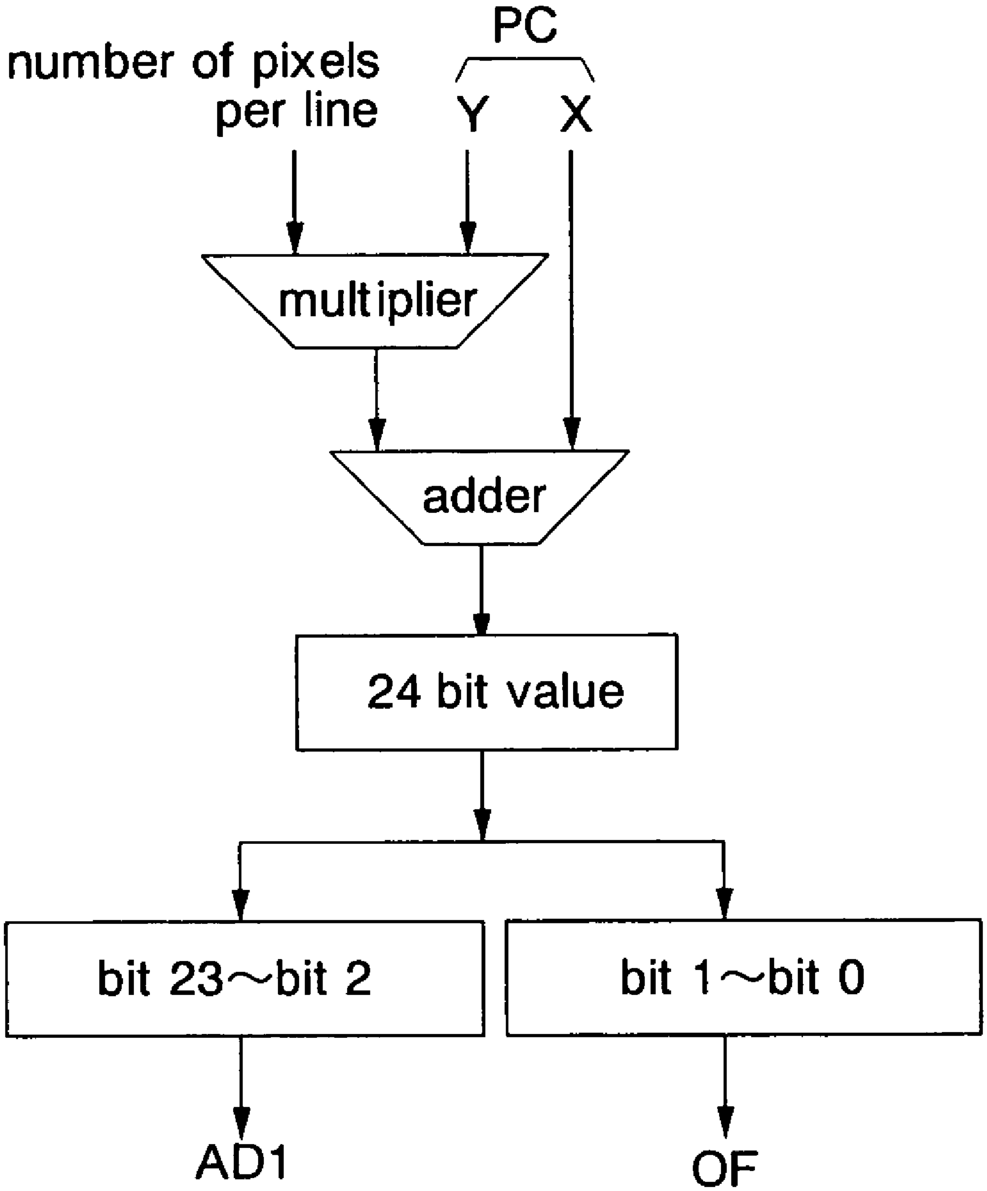
FIG. 3 is an explanatory chart showing the outline of the operation of an address converting unit shown in FIG. 1.

FIG. 3 shows the outline of the operation of the address converting unit 20 shown in FIG. 1. First, the ordinate Y of the pixel coordinates PC supplied from the controller 12 is multiplied by the number of pixels (640 pixels in this example) in one line of the liquid crystal display device LCD, thereby finding the first position corresponding to a display line at the ordinate Y when 480 display lines of the liquid crystal display device LCD are arranged in a row. Next, the abscissa X of the pixel coordinates PC is added to the found first position to find the position of the pixel coordinates PC on the display lines arranged in a row. The found position is converted to 24-bit data representing the frame buffer area shown in FIG. 2. In this embodiment, since data for one word corresponds to four pixels, upper 22 bits (bits 23 to 2) in a 24-bit value are outputted as the address AD and lower 2 bits (bits 1 to 0) are outputted as the offset OF.

Figure 4:
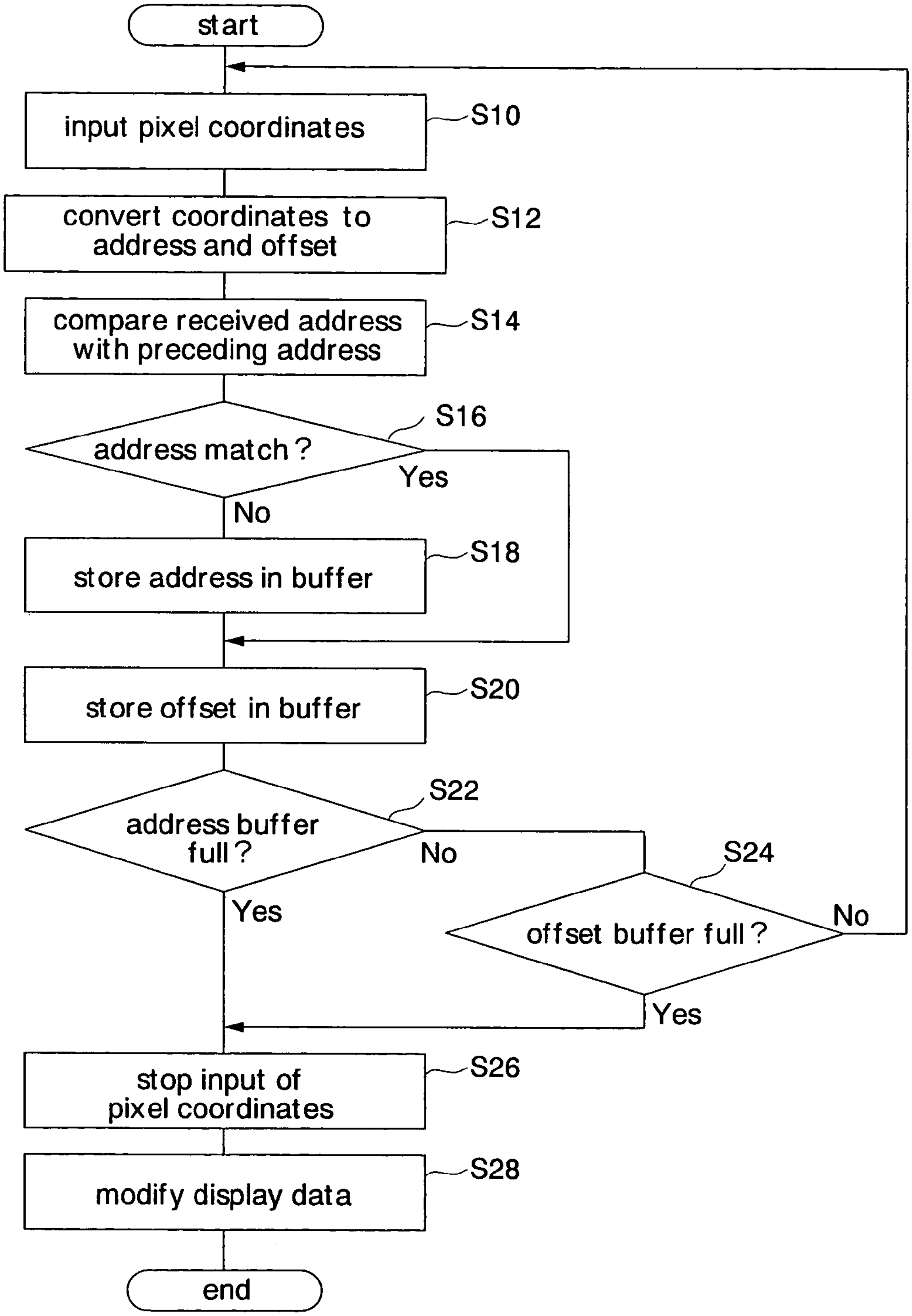
FIG. 4 is a flowchart showing a basic operation of a display data processing unit shown in FIG. 1.

FIG. 4 shows a basic operation of the display data processing unit 10 shown in FIG. 1. The operation described below is executed by the buffer controlling unit 32's controlling the address converting unit 20, the address comparing unit 22, the address buffer 24, the offset buffer 26, the data buffer 28, and the pixel processing unit 30. Note that FIG. 4 shows only processings relating to the pixel coordinates PC (the address AD and the offset OF), and description on processings relating to the pixel information PI will be omitted.

First, at Step S10, the pixel coordinates PC are inputted to the address converting unit 20. At Step S12, the address converting unit 20 processes the inputted pixel coordinates PC as shown in FIG. 3 to convert the pixel coordinates PC to the address AD and the offset OF.

At Step S14, the address comparing unit 22 compares the address AD currently received and the preceding address AD. When the compared addresses AD do not match with each other at Step S16, the address comparing unit 22 executes the processing of Step S18. When the compared addresses AD match with each other, the process goes to Step S20. At Step S18, the address comparing unit 22 stores in the address buffer 24 the address AD that is obtained in the current conversion.

At Step S20, the offset buffer 26 stores therein the offset OF outputted from the address converting unit 20. Note that the offset OF stored in the offset buffer 26 is associated to the address AD by the buffer controlling unit 32. At Step S22, the buffer controlling unit 32 judges whether or not the address buffer 24 is full. When the address buffer 24 is full, the process goes to Step S26. When the address buffer 24 is not full, the process goes to Step S24.

At Step S24, the buffer controlling unit 32 judges whether or not the offset buffer 26 is full. When the offset buffer 26 is full, the process goes to Step S26. When the offset buffer 26 is not full, the process returns to Step S10, where the pixel coordinates PC are inputted.

At Step S26, the buffer controlling unit 32 outputs the stop signal STP to the controller 12 so that the controller 12 stops inputting the pixel coordinates PC since the address buffer 24 or the offset buffer 26 is full.

At Step S28, in response to the instruction from the buffer controlling unit 32, the pixel processing unit 30 modifies the display data (8 words=32 pixels at the maximum), out of the display data stored in the frame buffer area of the SDRAM 18, which correspond to the addresses AD stored in the address buffer 24 and the offsets OF stored in the offset buffer 26. The modification processing will be explained in detail in FIG. 5 to be described later. Then, when the address buffer 24 and the offset buffer 26 get ready to be newly written by the modification of the display data, the buffer controlling unit 32 stops outputting the stop signal STP and receives new pixel coordinates PC from the controller 12.

Figure 5:
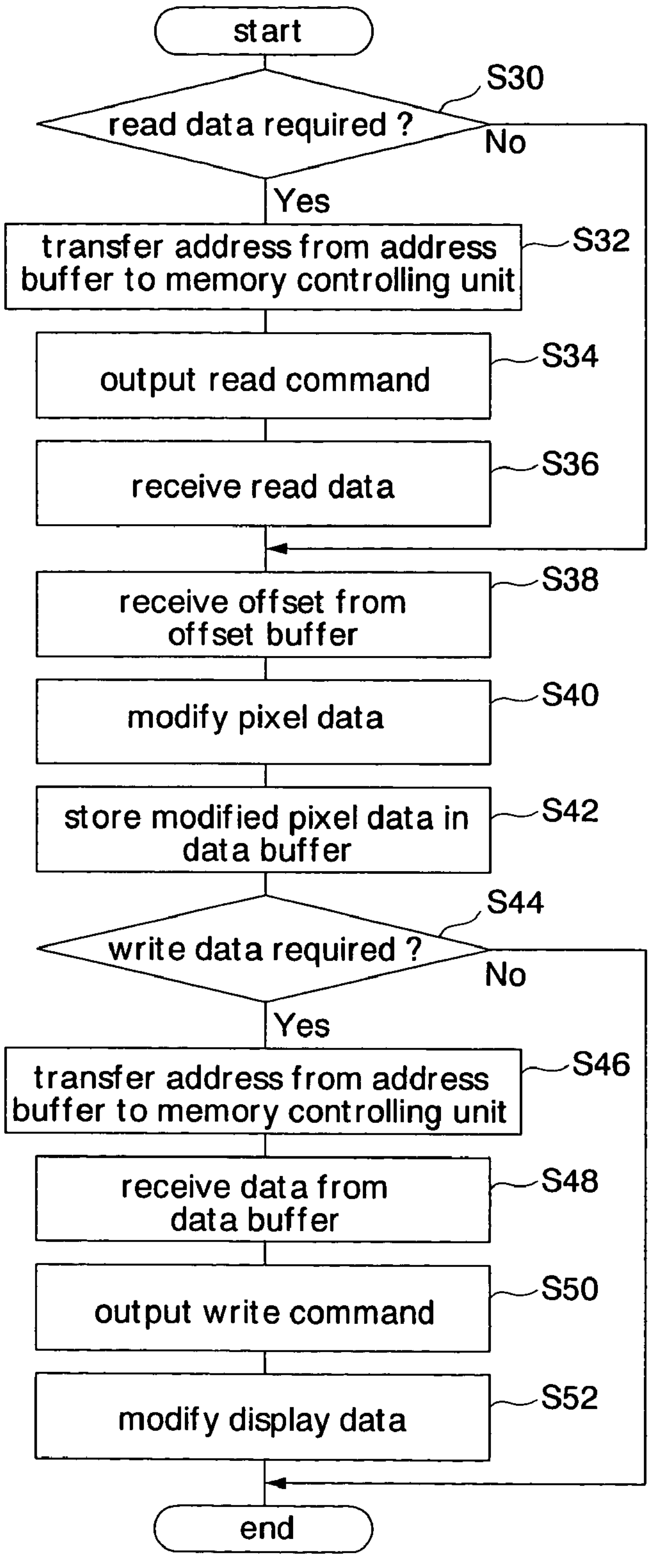
FIG. 5 is a flowchart showing modification processing on display data by the display data processing unit shown in FIG. 1.

FIG. 5 shows the modification processing on the display data by the display data processing unit 10 shown in FIG. 1. This processing corresponds to the processing of Step S28 shown in FIG. 4.

First, at Step S30, the buffer controlling unit 32 judges whether or not pixel data to be processed is stored in the pixel processing unit 30. When the pixel processing unit 30 has the pixel data to be processed, the process goes to Step S38, skipping Steps S32 to S36. When the pixel processing unit 30 has no pixel data to be processed, Steps S32 to S36 are executed in order to read pixel data from the SDRAM 18.

At Step S32, the buffer controlling unit 32 transfers the addresses AD stored in the address buffer 24 to the memory controlling unit 16 in sequence. At Step S34, the buffer controlling unit 32 outputs a read command to the memory controlling unit 16. In response to the read command, the memory controlling unit 16 accesses the SDRAM 18 to read the pixel data stored in plural addresses AD. When the plural addresses AD are continuous, the read operation is executed through the use of the burst access function of the SDRAM 18. At Step S36, the buffer controlling unit 32 stores the pixel data read by the memory controlling unit 16 in the data buffer 28.

Next, at Step S38, the buffer controlling unit 32 transfers the offsets OF stored in the offset buffer 26 to the pixel processing unit 30 in sequence in such a manner that the offsets OF are associated with the addresses AD. At Step S40, the pixel processing unit 30 reads the pixel data stored in the data buffer 28 to modify the pixel data according to new pixel information PI supplied from the controller 12. At this time, the pixel data for 8 words (32 pixels) are modified at the maximum at once. At Step S42, the pixel processing unit 30 stores the modified pixel data in the data buffer 28. In other words, the data buffer 28 is overwritten with the data to be newly displayed on the liquid crystal display device LCD.

At Step S44, the buffer controlling unit 32 judges whether or not the pixel data stored in the data buffer 28 is to be written to the SDRAM 18. When the data write to the SDRAM 18 is required, Steps S46 to S52 are executed. When the data write to the SDRAM 18 is not required, the process is finished, skipping Steps S46 to S52.

At Step S46, the buffer controlling unit 32 transfers the addresses AD stored in the address buffer 24 to the memory controlling unit 16 in sequence. Note that in a case where the memory controlling unit 16 can hold the addresses AD obtained at Step S32 described above, Step S46 is omissible. At Step S48, the buffer controlling unit 32 transfers the pixel data stored in the data buffer 28 to the memory controlling unit 16 in sequence. At Step S50, the buffer controlling unit 32 outputs a write command to the memory controlling unit 16. At Step S52, in response to the write command, the memory controlling unit 16 accesses the SDRAM 18 to write the pixel data to the plural addresses AD. When the plural addresses AD are continuous, the write operation is executed through the use of the burst access function of the SDRAM 18. Then, the SDRAM 18 is overwritten with new data to be displayed on the liquid crystal display device LCD.

As described above, the display data processing unit 10 modifies the display data for not pixel by pixel or word by word (4 pixels) but 8 words (32 pixels) at the maximum at a time; therefore, the pixel data of the plural words (8 words at the maximum) are read from/written to the SDRAM 18. This consequently can improve the access efficiency to the SDRAM 18. As a result, the display speed of the liquid crystal display device LCD can be increased, resulting in enhancing the performance of the car navigation system. Further, the burst access function of the SDRAM 18 can be utilized to read/write the display data of the plural words continuously. The use of the burst access function further improves the access efficiency.

As described above, in this embodiment, when either the address buffer 24 storing the plural addresses AD or the offset buffer 26 storing the plural offsets OF is full, the pixel data corresponding to the addresses AD and the offsets OF stored in the address buffer 24 and the offset buffer 26 are modified at once. This lowers the access frequency to the SDRAM 18, enabling improved access efficiency. As a result, it is able to shorten the time required for displaying the pixel data on the display screen of the liquid crystal display device LCD. Accordingly, it is able to increase the speed at which the pixel data is displayed on the liquid crystal display device LCD. Especially, great improvement in access efficiency to the SDRAM 18 is achievable by the memory controlling unit 16's control over successively reading the pixel data corresponding to the plural addresses from the SDRAM 18 and successively writing the pixel data modified by the pixel processing unit 30 to the SDRAM 18 in response to the detection by the buffer controlling unit 32. Specifically, when the access addresses of the SDRAM 18 are continuous, the read operation and the write operation from/to the SDRAM 18 are executed through the use of the burst access function, thereby further improving the access efficiency.

Figure 6:
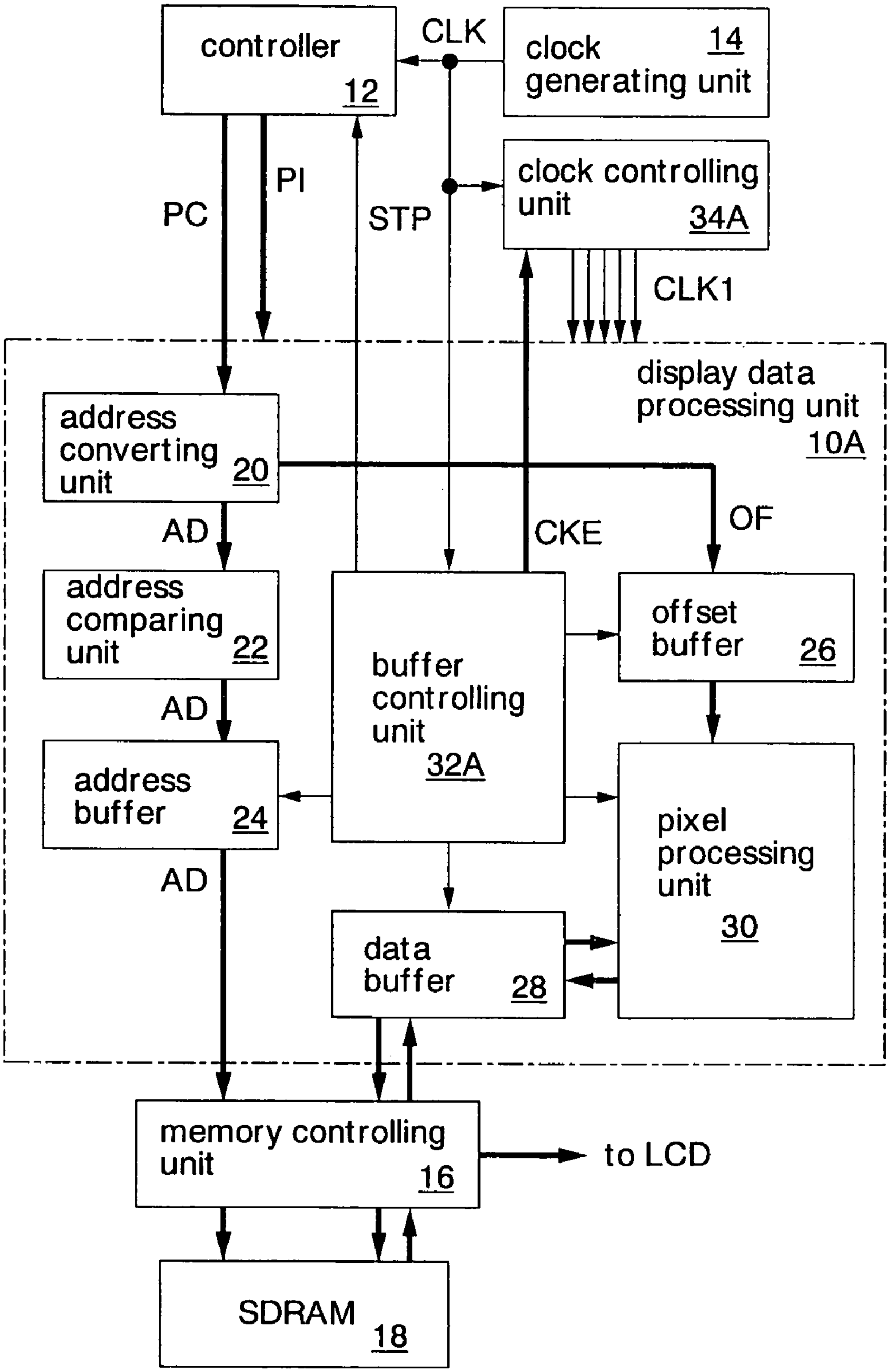
FIG. 6 is a block diagram showing a second embodiment of the display data generating device of the present invention.

FIG. 6 shows a second embodiment of the display data generating device of the present invention. The same reference numerals and symbols are used to designate the same element as the elements described in the first embodiment, and detailed explanation thereof will be omitted. The display data generating device of this embodiment is mounted in, for example, a car navigation system.

The display data generating device has a display data processing unit 10A in place of the display data processing unit 10 of the display data generating device of the first embodiment. Further, a clock controlling unit 34A is newly formed. The other configuration is the same as that of the first embodiment.

The clock controlling unit 34A outputs a plurality of clocks CLK1 in synchronization with a clock CLK while each of a plurality of clock enable signals CKE outputted from a buffer controlling unit 32A are activated. The clocks CLK1 corresponding to deactivated clock enable signals CKE are not outputted. The clocks CLK1 are supplied to circuit blocks 20, 22, 24, 26, 28, 30 in the display data processing unit 10 except the buffer controlling unit 23A.

The buffer controlling unit 32A of the display data processing unit 10A directly receives the clock CLK outputted by a clock generating unit 14. According to the operating state of the display data processing unit 10A, the buffer controlling unit 32A activates or deactivates the clock enable signals CKE corresponding to the circuit blocks 20, 22, 24, 26, 28, 30 respectively. The circuit blocks corresponding to the deactivated clock enable signals CKE do not receive the clocks CLK1. Separately stopping the supply of the clock CLK1 to each of the circuit blocks can reduce power consumption of the display data generating device.

Figure 7:
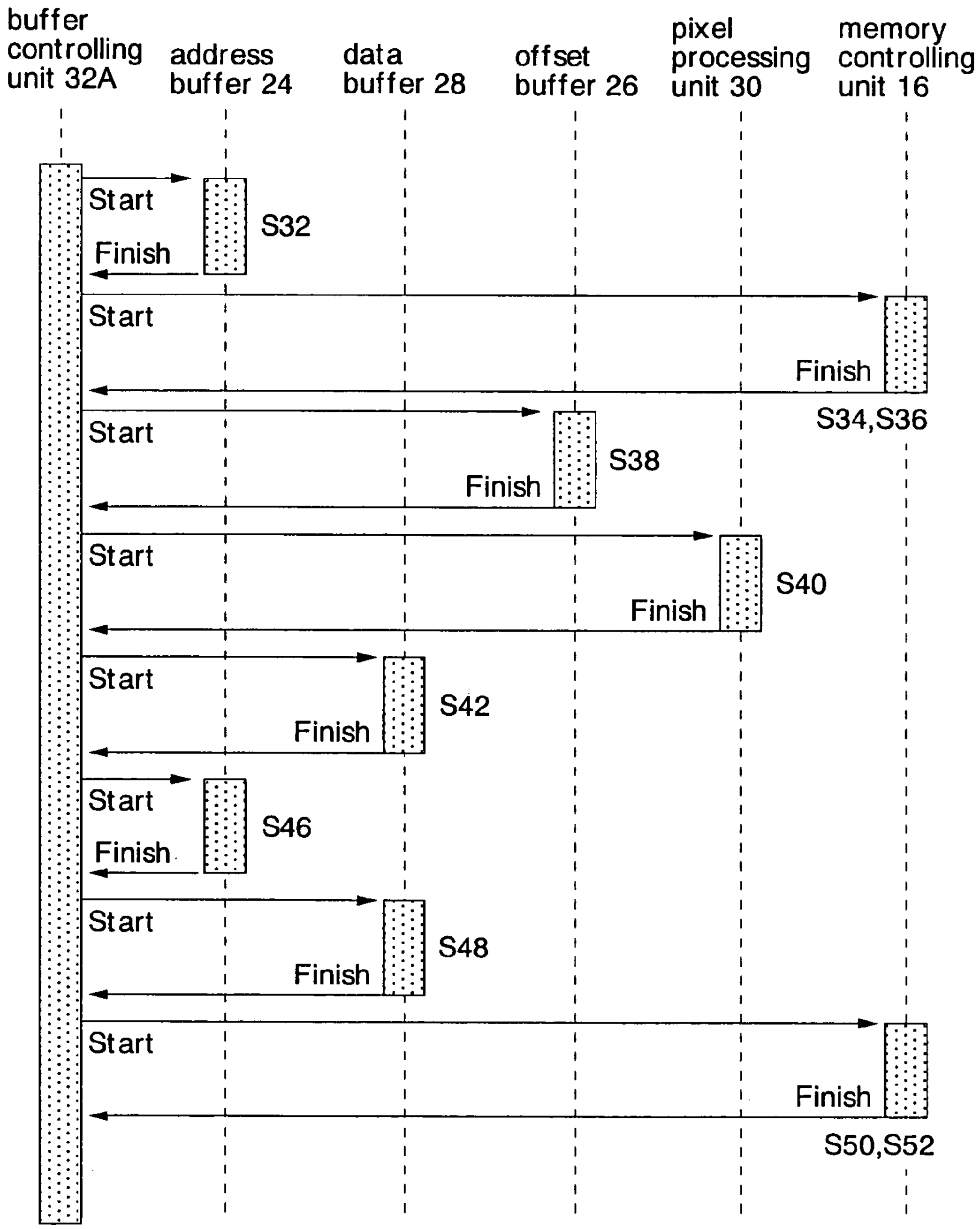
FIG. 7 is an explanatory chart showing modification processing on pixel data in the second embodiment.

FIG. 7 shows modification processing on pixel data in the second embodiment. In the drawing, "Start" represents an activation request to each of the circuit blocks from the buffer controlling unit 32A, and "Finish" represents a finish notification to the buffer controlling unit 32A from each of the circuit blocks. S32 to S52 in the drawing shows the processings shown in FIG. 5 described above. Hatched squares in the drawing represent circuit blocks in operation. As is obvious from the drawing, the circuit blocks 24, 26, 28, 30 have an operation period longer than a nonoperation period but the buffer controlling unit 32A does not. Therefore, the circuit blocks 24, 26, 28, 30, are supplied with the clocks CLK1 only during the periods represented by the hatched squares in the drawing and the supply of the clocks CLK1 are stopped during the other periods, so that their power consumption can be greatly reduced.

In this embodiment, the same effects as those in the above-described first embodiment are also obtainable. This embodiment further has an effect of greatly reducing power consumption of the display data generating device since the supply of the clocks CLK1 to the circuit blocks 24, 26, 28, 30 in nonoperation is stopped.

Figure 8:
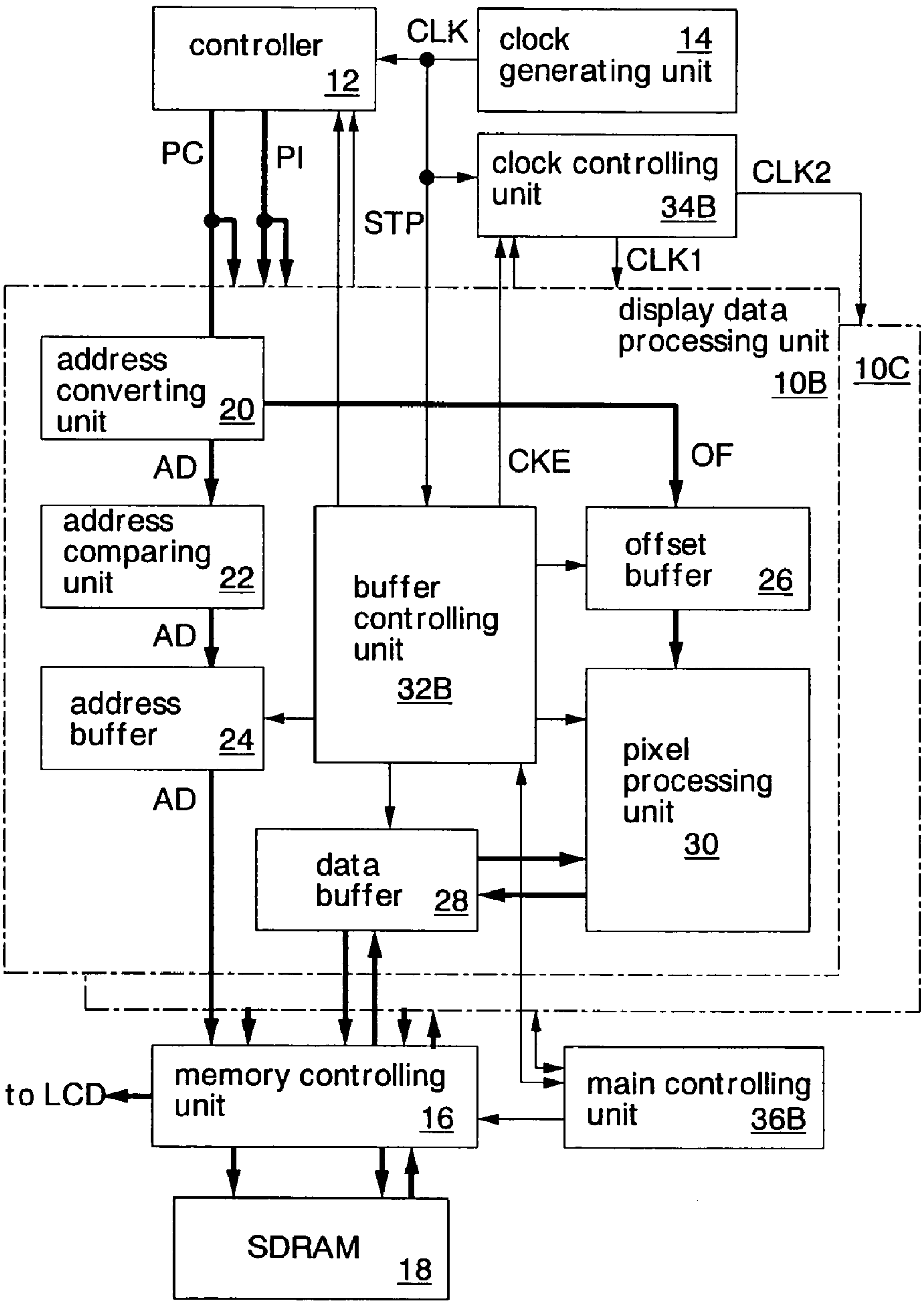
FIG. 8 is a block diagram showing a third embodiment of the display data generating device of the present invention.

FIG. 8 shows a third embodiment of the display data generating device of the present invention. The same reference numerals and symbols are used to designate the same elements as the elements described in the first and second embodiments, and detailed explanation thereof will be omitted. The display data generating device of this embodiment is mounted in, for example, a car navigation system.

The display data generating device has two display data processing units 10B, 10C in place of the display data processing unit 10 of the display data generating device of the first embodiment. Further, a clock controlling unit 34B and a main controlling unit 36B are newly formed. The other configuration is the same as that of the first embodiment.

The clock controlling unit 34B outputs a plurality of clocks CLK1, CLK2 in synchronization with a clock CLK while clock enable signals CKE outputted from buffer controlling units 32B of the display data processing units 10B, 10C respectively are activated. The clocks CLK1, CLK2 corresponding to deactivated clock enable signals CKE are not outputted. The clocks CLK1, CLK2 are basic clocks for operating the display data processing units 10B, 10C, respectively.

The display data processing unit 10B is the same as the display data processing unit 10 of the first embodiment except in the buffer controlling unit 32B. The display data processing unit 10B (pixel controlling unit) processes pixel data to be displayed on a liquid crystal display device LCD similarly to the first embodiment. The display data processing unit 10C is constituted of the same elements as those of the display data processing unit 10B. The display data processing unit 10C (Z controlling unit) processes a Z value corresponding to the pixel data processed by the display data processing unit 10B. Here, the Z value is information representing the depth of the pixel data. The display data processing unit 10B receives pixel coordinates PC and pixel information PI (pixel data) from a controller 12. The display data processing unit 10C receives pixel coordinates PC and pixel information PI (Z value) from the controller 12.

A main controlling unit 36B controls the display data processing units 10B, 10C and a memory controlling unit 16 to execute modification processing on pixel data synchronously. The main controlling unit 36B controls them to start the modification processing on the pixel data when one of address buffers 24 and offset buffers 26 of the display data processing units 10B, 10C is full.

Figure 9:
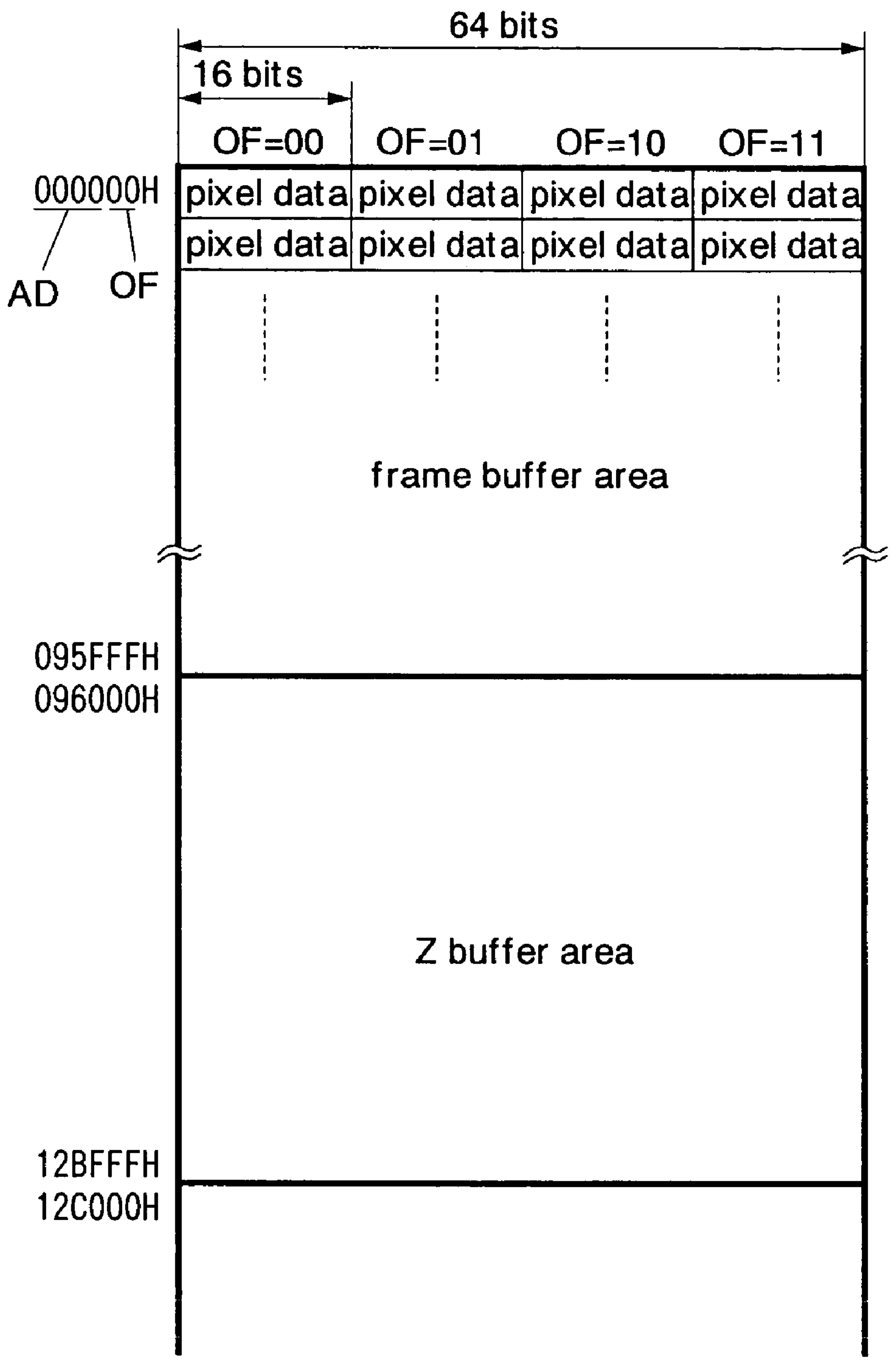
FIG. 9 is an explanatory view showing a memory space of an SDRAM shown in FIG. 8.

FIG. 9 shows a memory space of an SDRAM 18 shown in FIG. 8. In the memory space of the SDRAM 18, addresses 000000H to 095FFFH are allotted to a frame buffer area storing display data for 8 frames of the liquid crystal display device LCD, and addresses 096000H to 12BFFFH are allotted to a Z buffer area storing Z values for 8 frames of the liquid crystal display device LCD. The frame buffer area is the same as that of the first embodiment (FIG. 2). The frame buffer area and the Z buffer area have the same size. Therefore, data areas of one word (64 bits) in both of the frame buffer area and the Z buffer area store therein data for 4 pixels.

Figure 10:
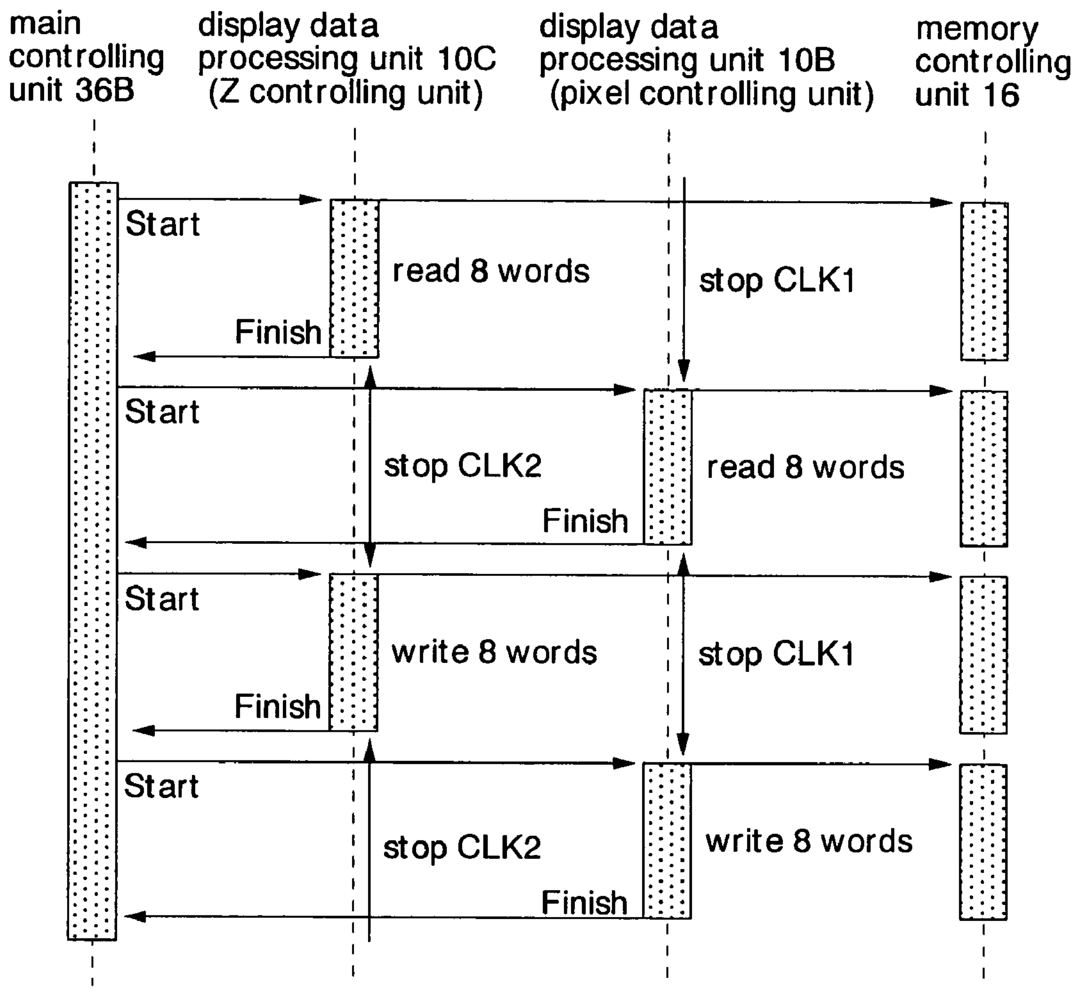
FIG. 10 is an explanatory chart showing modification processing on pixel data in the third embodiment.

FIG. 10 shows the modification processing on the pixel data by the display data processing units 10B, 10C in the third embodiment. This processing is executed after one of the address buffers 24 and the offset buffers 26 becomes full.

In the drawing, "Start" represents an activation request from the main controlling unit 36B to each of the display data processing units 10B, 10C, and "Finish" represents a finish notification from each of the display data processing units 10B, 10C to the main controlling unit 36B. Hatched squares in the drawing represent blocks in operation.

Based on the notification from the buffer controlling unit 32B of the display data processing unit 10B (or 10C), the main controlling unit 36B detects that one of the address buffer 24 and the offset buffer 26 is full. The main controlling unit 36B sequentially puts the display data processing units 10C, 10B into operation, so that pixel data are read from each of memory areas of the SDRAM 18 designated by a plurality of addresses AD stored in each of the address buffers 24. The pixel data for 8 words (32 pixels) at the maximum are read at a time. The read pixel data are processed by each of the pixel processing units 30. Here, since the display data processing units 10B, 10C share the single memory controlling unit 16, they have to operate alternately. Therefore, when one of the display data processing units 10B, 10C is in operation, the other one is in nonoperation.

Next, the main controlling unit 36B puts the display data processing units 10C, 10B into operation in sequence, so that the pixel data processed by each of the pixel processing units 30 are written to the memory areas of the SDRAM 18 represented by the plural addresses AD stored in each of the address buffers 24. The pixel data for 8 words (32 pixels) are written at the maximum at a time. Note that the read operation and the write operation are both successively executed by use of a burst access function of the SDRAM 18.

Only one access to the SDRAM 18 is allowed at a time, so that the display data processing units 10C, 10B have to access the memory controlling unit 16 alternately. This means that while one of the display data processing units 10C, 10B is in operation, the other one of the display data processing units 10C, 10B is in an idle state. The buffer controlling units 32B of the display data processing units 10C, 10B receive instructions from the main controlling unit 36B to deactivate the clock enable signals CKE during the idle state when internal operations are not necessary. Triggered by the deactivation of the clock enable signal CKE, the supply of the clock CLK2 (or CLK1) to the circuit blocks except the buffer controlling unit 32B of the display data processing unit 10C (or 10B) is stopped. This reduces the power consumption of the display data generating device.

In this embodiment, the same effects as those of the above-described first and second embodiments are also obtainable. This embodiment further has an effect of greatly reducing power consumption of the display data generating device since the supply of the clocks CLK2, CLK1 to the display data processing units 10C, 10B in the idle state is stopped.

Figure 11:
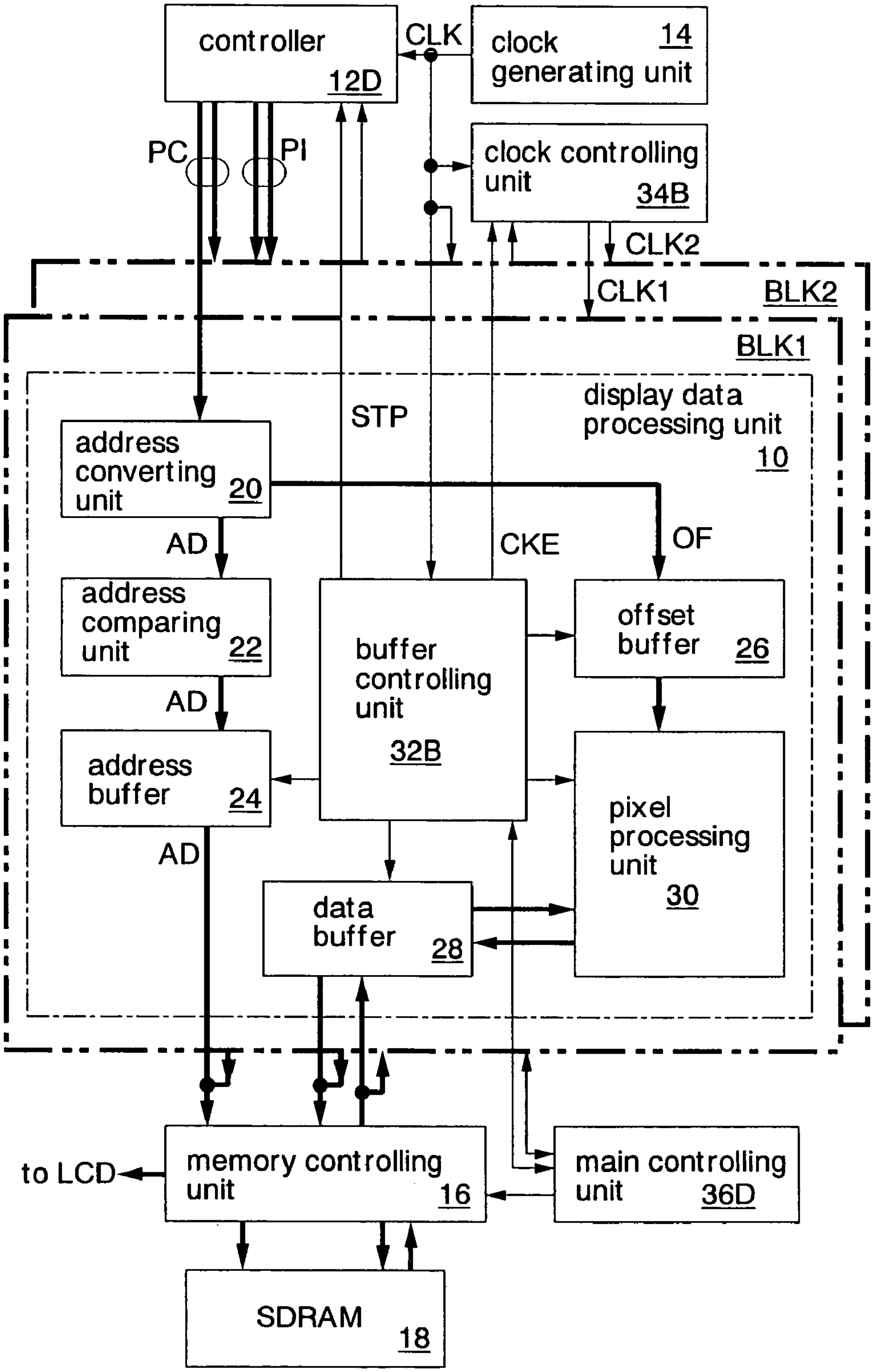
FIG. 11 is a block diagram showing a fourth embodiment of the display data generating device of the present invention.

FIG. 11 shows a fourth embodiment of the display data generating device of the present invention. The same reference numerals and symbols are used to designate the same elements as the elements described in the first to third embodiments, and detailed explanation thereof will be omitted. The display data generating device of this embodiment is mounted in, for example, a car navigation system.

The display data generating device has two pixel processing blocks BLK1, BLK2 each having the display data processing unit 10 of the first embodiment. The display data generating device further has a controller 12D and a main controlling unit 36D in place of the controller 12 and main controlling unit 36B of the third embodiment. The other configuration is the same as that of the third embodiment.

The pixel processing blocks BLK1, BLK2 receive different pixel coordinates PC and pixel information PI from the controller 12D respectively to operate independently from each other in order to modify pixel data stored in an SDRAM 18. While receiving a stop signal STP from a buffer controlling unit 32B of the pixel processing block BLK1 or BLK2, the controller 12D stops outputting the pixel coordinates PC and the pixel information PI to the corresponding one of the pixel processing blocks BLK1, BLK2.

In order to activate the respective display data processing units 10 of the pixel processing blocks BLK1, BLK2, the main controlling unit 36D controls the display data processing units 10 and a memory controlling unit 16. A clock controlling unit 34B outputs clocks CLK1, CLK2 during activation of clock enable signals CKE which are outputted from respective buffer controlling units 32B formed in the display data processing units 10 of the pixel processing blocks BLK1, BLK2. The clock controlling unit 34B stops outputting the clocks CLK1, CLK2 during the deactivation of the clock enable signals CKE.

Figure 12:
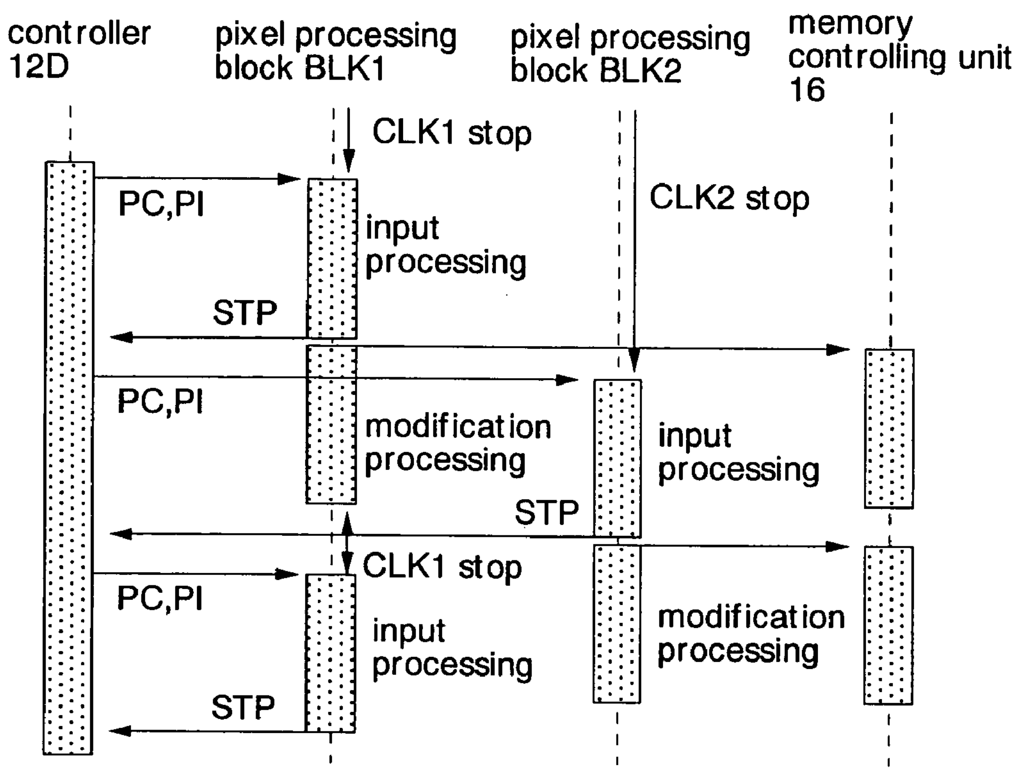
FIG. 12 is an explanatory chart showing the outline of the operation of the display data generating device in the fourth embodiment.

FIG. 12 shows the outline of the operation of the display data generating device in the fourth embodiment. This display data generating device is characterized in that it executes modification processing on different pieces of pixel data simultaneously, in parallel. For example, the controller 12D outputs the pixel coordinates PC and the pixel information PI in sequence to the pixel processing blocks BLK1, BLK2. Each of the display data processing units 10 of the pixel processing blocks BLK1, BLK2 operates independently from each other, and receives the pixel coordinates PC and the pixel information PI from the controller 12D until the address buffer 24 or the offset buffer 26 becomes full as at Steps S110 to S26 shown in FIG. 4. Each of the display data processing units 10 having a full address buffer 24 or offset buffer 26 operates independently after outputting the stop signal STP, and executes the modification processing on the pixel data as in the flow shown in FIG. 5. The read operation and the write operation from/to the SDRAM 18 are both executed successively through the use of a burst access function.

Then, while the display data processing unit 10 of the pixel processing block BLK1 is receiving the pixel coordinates PC and the pixel information PI, the display data processing unit 10 of the pixel processing block BLK2 executes the modification processing on the pixel data, and while the display data processing unit 10 of the pixel processing block BLK2 is receiving the pixel coordinates PC and the pixel information PI, the display data processing unit 10 of the pixel processing block BLK 1 executes the modification processing on the pixel data. The increased operation frequency of the memory controlling unit 16 results in further improvement in access efficiency to the SDRAM 18. Moreover, power consumption is reduced since the supply of the clock CLK1 (or CLK2) to the pixel processing block BLK1 (or BLK2) is stopped during the idle period under the control by the clock controlling unit 34B.

In this embodiment, the same effects as those of the above-described embodiments are also obtainable. In addition, this embodiment has an effect of further improving access efficiency to the SDRAM 18 since the operation frequency of the memory controlling unit 16 is increased owing to the plural pixel processing blocks BLK1, BLK2 that execute the modification processing on the different pieces of the pixel data from each other. As a result, the display speed of an image on a liquid crystal display device LCD can be further increased. Power consumption of the display data generating device can be reduced because the supply of the clocks CLK1, CLK2 to the pixel processing blocks BLK1, BLK2 during the idle period is stopped.

Figure 13:
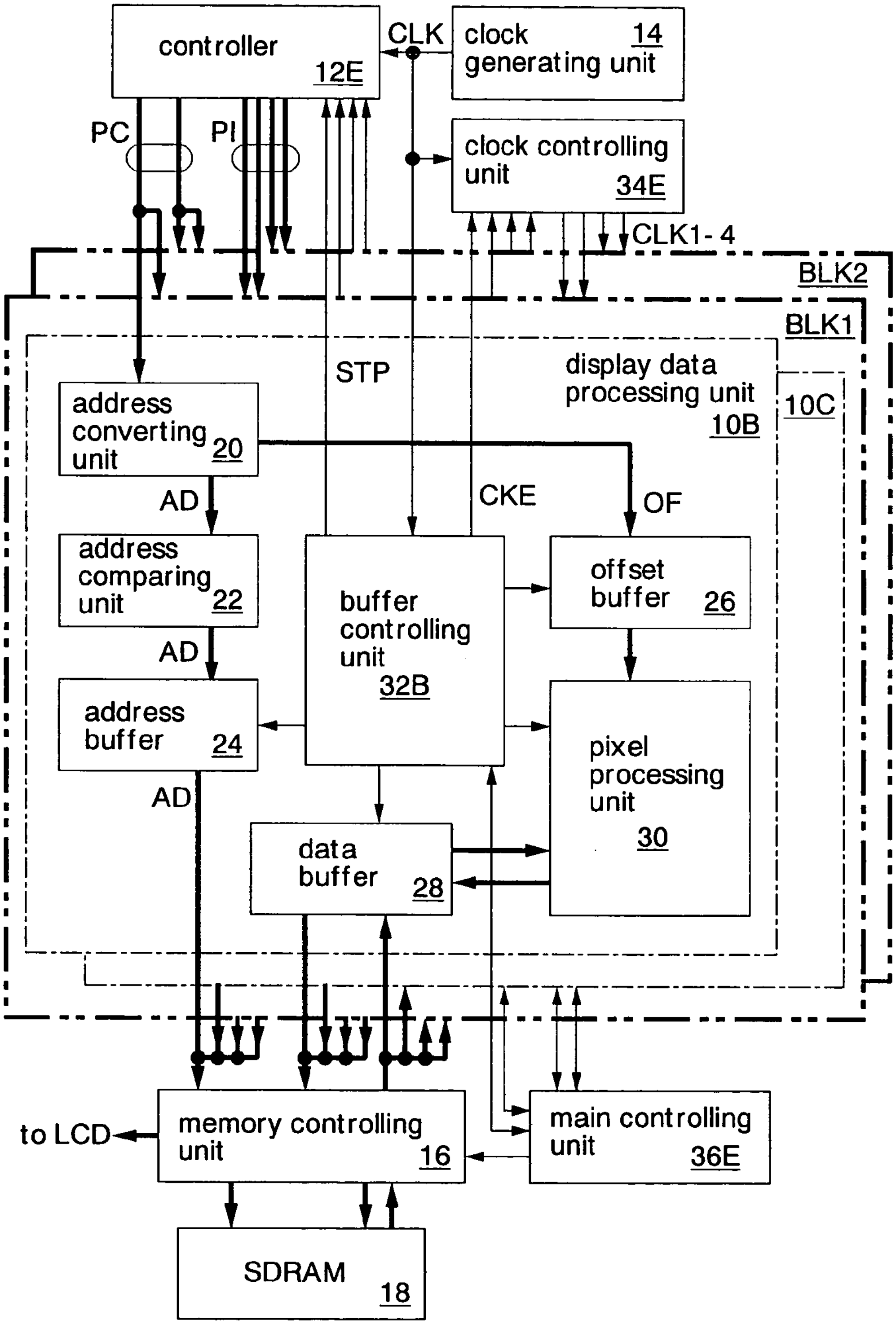
FIG. 13 is a block diagram showing a fifth embodiment of the display data generating device of the present invention.

FIG. 13 shows a fifth embodiment of the display data generating device of the present invention. The same reference numerals and symbols are used to designate the same elements as the elements described in the first to third embodiments, and detailed explanation thereof will be omitted. The display data generating device of this embodiment is mounted in, for example, a car navigation system.

The display data generating device has two pixel processing blocks BLK1, BLK2 each having therein the display data processing units 10B, 10C of the display data generating device of the third embodiment. The display data generating device further includes a controller 12E, a main controlling unit 36E, a clock controlling unit 34E in place of the controller 12, main controlling unit 36B, and clock controlling unit 34B of the third embodiment. The other configuration is the same as that of the third embodiment.

The pixel processing blocks BLK1, BLK2 receive different pixel coordinates PC and pixel information PI (pixel data and Z values) from the controller 12D similarly to the above-described fourth embodiment and operate independently from each other to modify pixel data stored in an SDRAM 18. While receiving stop signals STP from buffer controlling units 32B of each of the pixel processing blocks BLK1, BLK2, the controller 12E stops outputting the pixel coordinates PC and the pixel information PI to the corresponding one of the pixel processing blocks BLK1, BLK2.

In order to activate the display data processing units 10B, 10C of the pixel processing blocks BLK1, BLK2 respectively, the main controlling unit 36E controls the display data processing units 10B, 10C and a memory controlling unit 16. The clock controlling unit 34E outputs clocks CLK1 to CLK4 during activation of clock enable signals CKE which are outputted from buffer controlling units 32B formed in the display data processing units 10B, 10C of the pixel processing blocks BLK1, BLK2, respectively. The clock controlling unit 34E stops outputting the clocks CLK1 to CLK4 during deactivation of the clock enable signals CKE.

In the display data generating device of this embodiment, the display data processing units 10B, 10C of the pixel processing blocks BLK1, BLK2 operate as shown in FIG. 10. At this time, the read operation and the write operation to/from the SDRAM 18 are both executed successively through the use of a burst access function. Further, as in FIG. 12, the pixel processing blocks BLK1, BLK2 operate alternately under the control by the main controlling unit 36E. In this embodiment, the same effects as those in the above-described embodiments are also obtainable.

Figure 14:
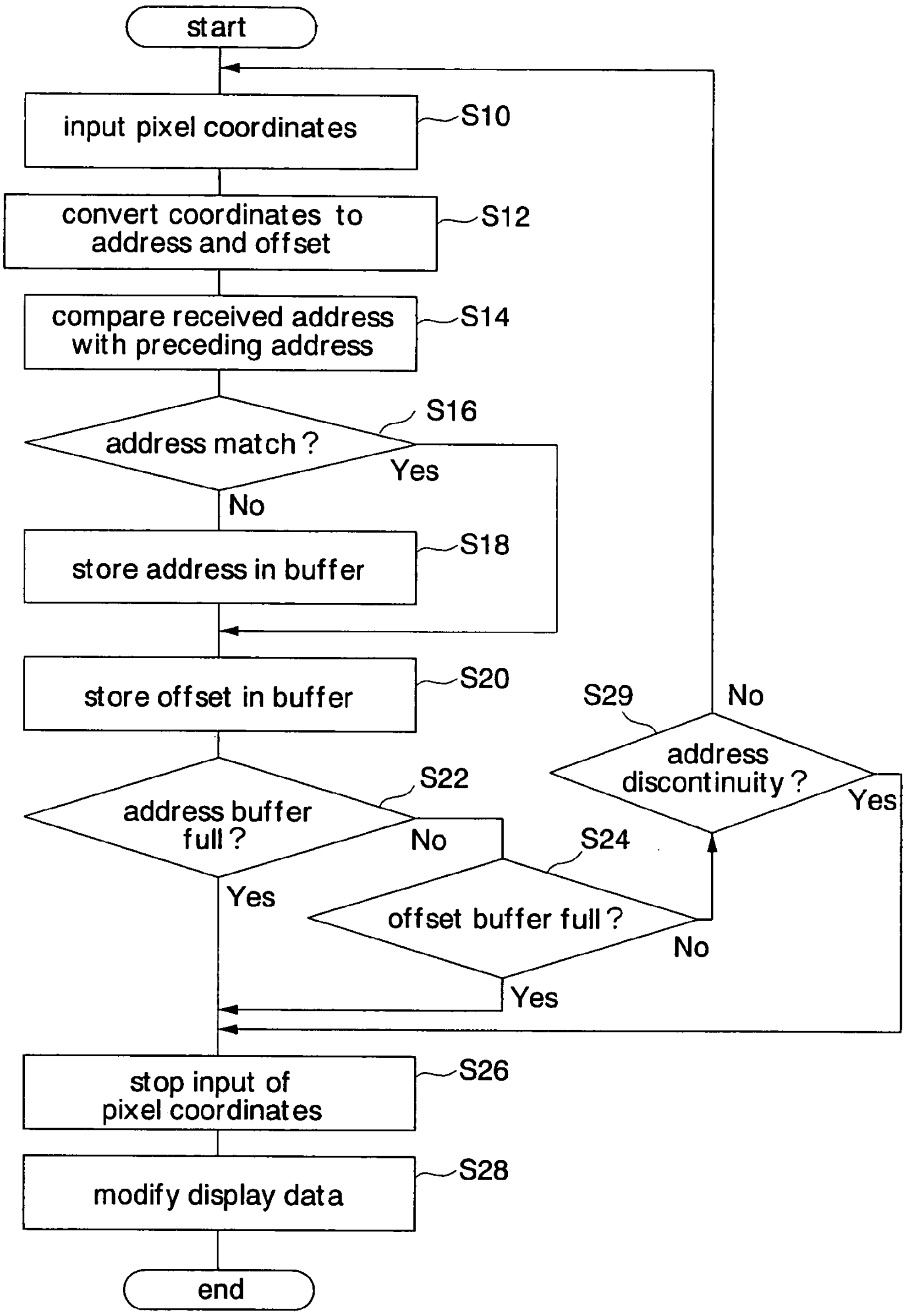
FIG. 14 is a flowchart showing a basic operation of a display data processing unit in a sixth embodiment of the display data generating device of the present invention.

FIG. 14 shows the operation of a display data processing unit in a sixth embodiment of the display data generating device of the present invention. The same reference numerals and symbols are used to designate the same elements as the elements described in the first embodiment, and detailed explanation thereof will be omitted. A buffer controlling unit (not shown) of the display data processing unit of this embodiment is different from the buffer controlling unit 32 of the first embodiment. The other configuration is the same as that of the first embodiment (FIG. 1 to FIG. 3, and FIG. 5). The display data generating device is mounted in, for example, a car navigation system.

The flow shown in FIG. 14 is the same as the flow (FIG. 4) of the first embodiment except in that Step S29 is newly added. The processes of Steps S10 to S28 are the same as those of the first embodiment. The process of Step S29 is started when it is judged at Step S24 that an offset buffer 26 is not full. At Step S29, it is judged whether or not addresses AD stored in an address buffer 24 are discontinuous. In other words, discontinuity of the addresses AD stored in the address buffer 24 is detected. When the addresses AD are discontinuous, the process goes to Step S26, where modification processing on display data is executed. This means that a pixel processing unit 30 starts the modification processing on the display data when the addresses AD stored in the address buffer 24 become discontinuous. This enables efficient access to areas having continuous addresses in an SDRAM 18, resulting in improved access efficiency. When the addresses AD are continuous, the process returns to Step S10.

In this embodiment, the same effects as those of the above-described first embodiment are also obtainable. In addition, in this embodiment, the modification of the display data is started at an instant when the addresses AD stored in the address buffer 24 become discontinuous, even when neither the address buffer 24 nor the offset buffer 26 is full. This makes it possible to constantly maintain continuity of the access addresses of the SDRAM 18. As a result, access efficiency can be improved, resulting in increase in the display speed of the pixel data on a liquid crystal display device LCD.

Figure 15:
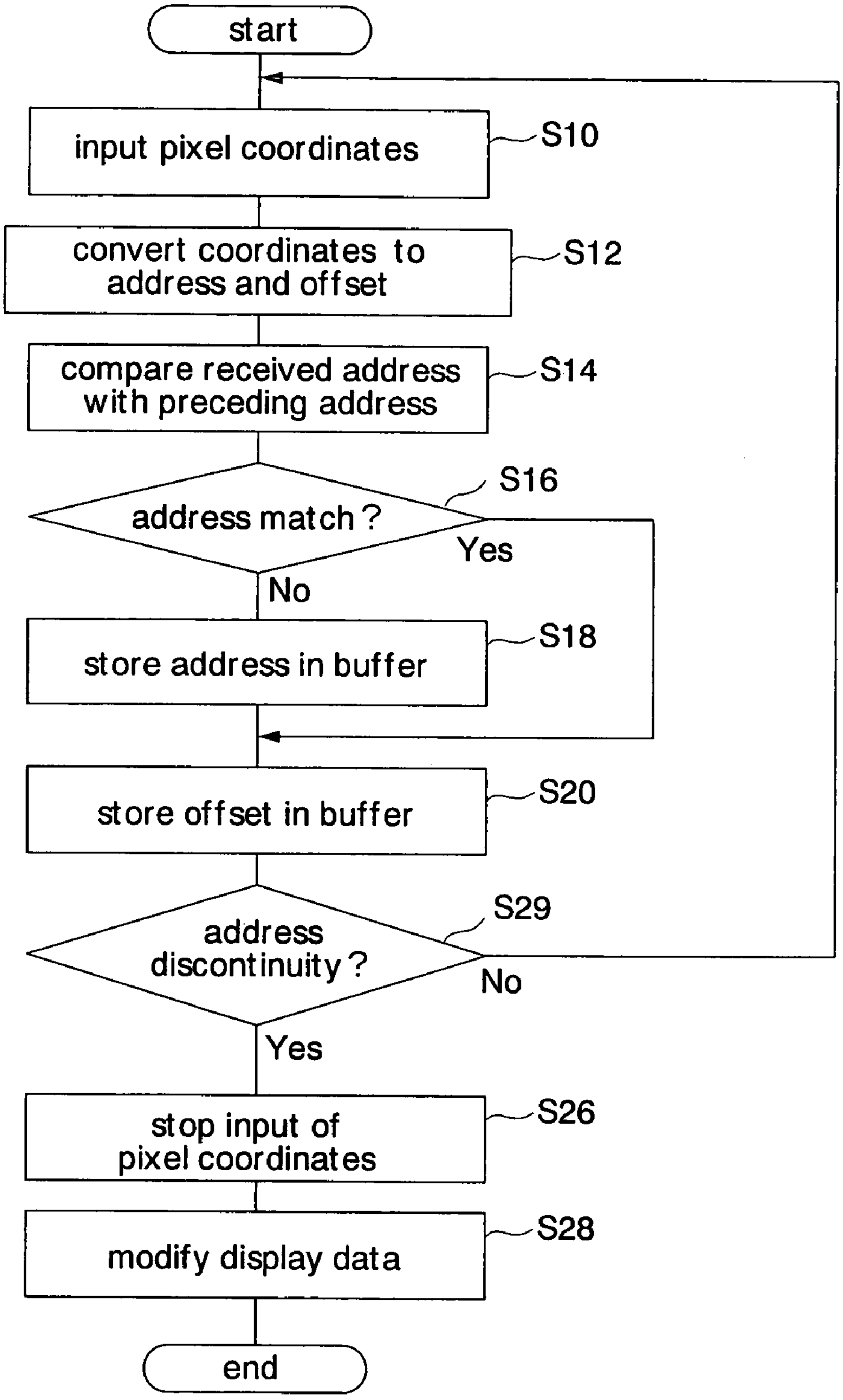
FIG. 15 is a flowchart showing a basic operation of a display data processing unit in a seventh embodiment of the display data generating device of the present invention.

FIG. 15 shows the operation of a display data processing unit in a seventh embodiment of the display data generating device of the present invention. The same reference numerals and symbols are used to designate the same elements as the elements described in the first and sixth embodiments, and detailed explanation thereof will be omitted. A buffer controlling unit (not shown) of the display data processing unit of this embodiment is different from the buffer controlling unit 32 of the first embodiment. The other configuration is the same as that of the first embodiment (FIG. 1 to FIG. 3, and FIG. 5). The display data generating device is mounted in, for example, a car navigation system.

The flow shown in FIG. 15 is the same as the flow (FIG. 4) of the first embodiment except that Steps S22, S24 are omitted and Step S29 is newly added. The processes of Steps S10 to S20, S26, S28 are the same as those of the first embodiment. The process of Step S29 is the same as that of the sixth embodiment. The processing of Step S29 is executed every time an offset OF is stored in an offset buffer 26 at Step S20. Then, when addresses AD stored in an address buffer 24 are discontinuous, the process goes to Step S26, where modification processing on display data is executed. When the addresses AD are continuous, the process returns to Step S10.

In this embodiment, the same effects as those of the above-described first and sixth embodiments are also obtainable. In addition, in this embodiment, the load of the buffer controlling unit can be reduced since the processes of Steps S22, S24 shown in FIG. 14 can be omitted.

The above-described embodiments have described the examples where the present invention is applied to the car navigation system. The present invention is not limited to such embodiments. The present invention is applicable to, for example, portable devices such as a game machine and a cellular phone.

In the examples of the above-described third and fifth embodiments, the present invention is applied to the display data generating device having the display data processing unit 10B that processes the pixel data and the display data processing unit 10C that processes Z values. The present invention is not limited to such embodiments. The present invention is applicable to, for example, a display data generating device that has, in addition to the display data processing units 10B, 10C, a display data processing unit for processing texture data as pixel data on characters or the like in an animation.

The technique described in the second embodiment may be applied to the third to seventh embodiments to control the clock supply on a circuit block basis. In this case, power consumption of the display data generating device can be further reduced.

In the examples of the above-describe embodiments, each of the address buffer 24, the data buffer 28, and the offset buffer 26 formed in the display data processing unit has a capacity for storing information corresponding to 8 words, and pixel data for 8 words at the maximum undergo the modification processing at a time. The present invention is not limited to such embodiments. For example, each buffer may be designed to have a capacity to store 16 words or more and pixel data for more than 8 words may be modified at a time.

This enables further improvement in the access efficiency to the SDRAM 18, resulting in further increase in the display speed of an image on a liquid crystal display device LCD. It is possible to increase the capacity of each buffer up to a value corresponding to the maximum burst length of the SDRAM 18.

The invention is not limited to the above embodiments and various modifications may be made without departing from the spirit and scope of the invention. Any improvement may be made in part or all of the components.

What is claimed is:

1. A display data generating device comprising:

a memory device having memory areas allotted thereto and each storing, for each pixel, pixel data to be displayed on pixels of a display screen so that pixel data corresponding to a predetermined number of successive pixels are accessible at once;

an address converting unit that receives pixel coordinates of the display screen in sequence to convert each of the received pixel coordinates to an address and an offset, the address designating a position of one of the memory areas in said memory device, the offset representing a position at which the pixel data is stored in a memory area which is selected according to the address;

an address buffer storing therein addresses obtained from the conversions;

an offset buffer storing therein offsets obtained from the conversions, in association with the addresses;

an address comparing unit that compares two addresses obtained from the conversions in sequence, and inhibits the addresses from being redundantly stored in said address buffer when the addresses match with each other;

a buffer controlling unit detecting that one of said address buffer and said offset buffer is full; and a pixel processing unit that modifies, in response to the detection by said buffer controlling unit, pieces of pixel data according to pieces of pixel information, respectively, in order to rewrite the pixel data stored in said memory device according to the pieces of pixel information, the pieces of pixel data corresponding to a plurality of addresses read from said memory device, the pieces of pixel information being inputted in correspondence with the pixel coordinates.

2. The display data generating device according to claim 1, further comprising a memory controlling unit that successively reads from said memory device pixel data corresponding to a plurality of addresses and successively writes the pixel data modified by said pixel processing unit to said memory device, in response to the detection by said buffer controlling unit.

3. The display data generating device according to claim 1, further comprising:

a clock generating unit that generates clocks to be supplied to a plurality of circuit blocks in the display data generating device, respectively; and a clock controlling unit that stops supplying corresponding clock(s) to the circuit block(s) in nonoperation.

4. The display data generating device according to claim 1, wherein said memory device has a burst access function to be successively readable or writable of data corresponding to successive addresses upon receiving a first address and without receiving second and subsequent addresses.

5. A display data generating device comprising:

a memory device having memory areas allotted thereto and each storing, for each pixel, pixel data to be displayed on pixels of a display screen so that pixel data corresponding to a predetermined number of successive pixels are accessible at once;

an address converting unit that receives pixel coordinates of the display screen in sequence to convert each of the received pixel coordinates to an address and an offset, the address designating a position of one of the memory areas in said memory device, the offset representing a position at which the pixel data is stored in a memory area which is selected according to the address;

an address buffer storing therein addresses obtained from the conversions;

an offset buffer storing therein offsets obtained from the conversions, in association with the addresses;

an address comparing unit that compares two addresses obtained from the conversions in sequence, and inhibits the addresses from being redundantly stored in said address buffer when the addresses match with each other;

a buffer controlling unit detecting that one of said address buffer and said offset buffer is full; and a buffer controlling unit detecting that the addresses stored in said address buffer are discontinuous; and a pixel processing unit that modifies, in response to the detection by said buffer controlling unit, pieces of pixel data according to pieces of pixel information, respectively, in order to rewrite the pixel data stored in said memory device according to the pieces of pixel information, the pieces of pixel data corresponding to a plurality of addresses read from said memory device, the pieces of pixel information being inputted in correspondence with the pixel coordinates.

6. The display data generating device according to claim 5, further comprising a memory controlling unit that successively reads from said memory device pixel data corresponding to a plurality of addresses and successively writes the pixel data modified by said pixel processing unit to said memory device, in response to the detection by said buffer controlling unit.

7. The display data generating device according to claim 5, further comprising:

a clock generating unit that generates clocks to be supplied to a plurality of circuit blocks in the display data generating device, respectively; and a clock controlling unit that stops supplying corresponding clock(s) to the circuit block(s) in nonoperation.

8. The display data generating device according to claim 5, wherein said memory device has a burst access function to be successively readable or writable of data corresponding to successive addresses upon receiving a first address and without receiving second and subsequent addresses.

9. A display data generating device comprising:

a memory device having memory areas allotted thereto and each storing, for each pixel, pixel data to be displayed on pixels of a display screen so that pixel data corresponding to a predetermined number of successive pixels are accessible at once;

a plurality of display data processing units that process pieces of pixel information corresponding to one pixel, respectively; and a main controlling unit controlling operations of said display data processing units, wherein:

said display data processing units each includes an address converting unit that receives pixel coordinates of the display screen in sequence to convert each of the received pixel coordinates to an address and an offset, the address designating a position of one of the memory areas in said memory device, the offset representing a position at which the pixel data is stored in a memory area which is selected according to the address, an address buffer storing therein addresses obtained from the conversions, an offset buffer storing therein offsets obtained from the conversions, in association with the addresses, an address comparing unit that compares two addresses obtained from the conversions in sequence, and inhibits the addresses from being redundantly stored in said address buffer when the addresses match with each other, a buffer controlling unit detecting that one of said address buffer and said offset buffer is full, and a pixel processing unit that modifies, in response to the detection by said buffer controlling unit, pieces of pixel data according to pieces of pixel information, respectively, in order to rewrite the pixel data stored in said memory device according to the pieces of pixel information, the pieces of pixel data corresponding to a plurality of addresses read from said memory device, the pieces of pixel information being inputted in correspondence with the pixel coordinates; and in response to the detection by the buffer controlling unit of one of said display data processing units, said main controlling unit controls a corresponding pixel processing unit of one of said display data processing units to modify the pieces of pixel data and rewrite the pixel data stored in said memory device.

10. The display data generating device according to claim 9, further comprising a memory controlling unit that successively reads from said memory device pixel data corresponding to a plurality of addresses and successively writes the pixel data modified by said pixel processing unit to said memory device, in response to the detection by said buffer controlling unit.

11. The display data generating device according to claim 9, further comprising:

a clock generating unit that generates clocks to be supplied to said display data processing units, respectively; and a clock controlling unit that stops supplying corresponding clock(s) to the display data processing unit(s) in nonoperation.

12. The display data generating device according to claim 9, further comprising:

a clock generating unit that generates clocks to be supplied to a plurality of circuit blocks in the display data generating device, respectively; and a clock controlling unit that stops supplying corresponding clock(s) to the circuit block(s) in nonoperation.

13. The display data generating device according to claim 9, wherein said memory device has a burst access function to be successively readable or writable of data corresponding to successive addresses upon receiving a first address and without receiving second and subsequent addresses.

14. A display data generating device comprising:

a memory device having memory areas allotted thereto and each storing, for each pixel, pixel data to be displayed on pixels of a display screen so that pixel data corresponding to a predetermined number of successive pixels are accessible at once;

a plurality of pixel processing blocks each having a display data processing unit and processing pixel information corresponding to different pixels from each other, respectively; and a main controlling unit controlling operations of said pixel processing blocks, wherein:

the display data processing unit in each of said display processing blocks includes an address converting unit that receives pixel coordinates of the display screen in sequence to convert each of the received pixel coordinates to an address and an offset, the address designating a position of one of the memory areas in said memory device, the offset representing a position at which the pixel data is stored in a memory area which is selected according to the address, an address buffer storing therein addresses obtained from the conversions, an offset buffer storing therein offsets obtained from the conversions, in association with the addresses, an address comparing unit that compares two addresses obtained from the conversions in sequence, and inhibits the addresses from being redundantly stored in said address buffer when the addresses match with each other, a buffer controlling unit detecting that one of said address buffer and said offset buffer is full, and a pixel processing unit that modifies, in response to the detection by said buffer controlling unit, pieces of pixel data according to pieces of pixel information, respectively, in order to rewrite the pixel data stored in said memory device according to the pieces of pixel information, the pieces of pixel data corresponding to a plurality of addresses read from said memory device, the pieces of pixel information being inputted in correspondence with the pixel coordinates; and in response to the detection by the buffer controlling unit of the display data processing unit, said main controlling unit controls, for each of said pixel processing blocks, a corresponding pixel processing unit to modify the pieces of pixel data and rewrite the pixel data stored in said memory device.

15. The display data generating device according to claim 14, further comprising a memory controlling unit that successively reads from said memory device pixel data corresponding to a plurality of addresses and successively writes the pixel data modified by said pixel processing unit to said memory device in response to the detection by said buffer controlling unit in each of said pixel processing blocks.

16. The display data generating device according to claim 14, further comprising:

a clock generating unit that generates clocks to be supplied to said display data processing units, respectively; and a clock controlling unit that stops supplying corresponding clock(s) to the display data processing unit(s) in nonoperation.

17. The display data generating device according to claim 14, further comprising:

a clock generating unit that generates clocks to be supplied to a plurality of circuit blocks in the display data generating device, respectively; and a clock controlling unit that stops supplying corresponding clock(s) to the circuit block(s) in nonoperation.

18. The display data generating device according to claim 14, wherein said memory device has a burst access function to be successively readable or writable of data corresponding to successive addresses upon receiving a first address and without receiving second and subsequent addresses.

19. The display data generating device according to claim 14, wherein:

each of said pixel processing blocks comprises a plurality of display data processing units; and in response to the detection by the buffer controlling unit of one of said display data processing units in each of said pixel processing blocks, said main controlling unit controls a corresponding pixel processing unit of one of said display data processing units to modify the pieces of pixel data and rewrite the pixel data stored in said memory device.

20. The display data generating device according to claim 19, further comprising a memory controlling unit that successively reads from said memory device pixel data corresponding to a plurality of addresses and successively writes the pixel data modified by said pixel processing unit to said memory device, in response to the detection by said buffer controlling unit in each of said pixel processing blocks.

21. The display data generating device according to claim 19, further comprising:

a clock generating unit that generates clocks to be supplied to said display data processing units, respectively; and a clock controlling unit that stops supplying corresponding clock(s) to the display data processing unit(s) in nonoperation.

22. The display data generating device according to claim 19, further comprising:

a clock generating unit that generates clocks to be supplied to a plurality of circuit blocks in the display data generating device, respectively; and a clock controlling unit that stops supplying corresponding clock(s) to the circuit block(s) in nonoperation.

23. The display data generating device according to claim 19, wherein said memory device has a burst access function to be successively readable or writable of data corresponding to successive addresses upon receiving a first address and without receiving second and subsequent addresses.

* * * * *